United States Patent
Bertz et al.

(10) Patent No.: US 12,156,162 B2
(45) Date of Patent: *Nov. 26, 2024

(54) WIRELESS COMMUNICATION SERVICE DELIVERY TO USER EQUIPMENT (UE) USING AN ACCESS AND MOBILITY MANAGEMENT FUNCTION (AMF)

(71) Applicant: T-MOBILE INNOVATIONS LLC, Overland Park, KS (US)

(72) Inventors: Lyle T. Bertz, Lee's Summit, MO (US); Robert Keith Butler, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 18/159,375

(22) Filed: Jan. 25, 2023

(65) Prior Publication Data
US 2023/0164728 A1  May 25, 2023

Related U.S. Application Data

(63) Continuation of application No. 17/203,227, filed on Mar. 16, 2021, now Pat. No. 11,582,709.

(51) Int. Cl.
*H04W 60/00* (2009.01)
*H04W 8/08* (2009.01)
*H04W 60/04* (2009.01)

(52) U.S. Cl.
CPC ......... *H04W 60/005* (2013.01); *H04W 8/082* (2013.01); *H04W 60/04* (2013.01)

(58) Field of Classification Search
CPC ............ H04W 60/005; H04W 8/082
(Continued)

(56) References Cited

U.S. PATENT DOCUMENTS 9,100,382 B2   8/2015  Benoit et al.
10,021,561 B2  7/2018  Zhao et al.
(Continued)

FOREIGN PATENT DOCUMENTS

WO    2020030851 A1   2/2020

OTHER PUBLICATIONS

Ericsson; "Discussion on security for multiple NAS connections (KI #1.7)"; 3GPP TSG SA WG3 (Security) Meeting #87; May 15, 2017; 4 pages; S3-171274; 3GPP; Ljubljana, Slovenia.
(Continued)

*Primary Examiner* — Nghi H Ly

(57) ABSTRACT

A wireless communication network serves a wireless user device using N1 signaling. The wireless communication network establishes active N1 signaling links with the wireless user device and exchanges active N1 signaling with the wireless user device over the active N1 signaling links. The wireless communication network converts one of the active N1 signaling links for the wireless user device into an inactive N1 signaling link and exchanges inactive N1 signaling with the wireless user device to maintain the inactive N1 signaling link. The wireless communication network converts the inactive N1 signaling link for the wireless user device back into the one of the active N1 signaling links without performing a new registration for the wireless user device. The wireless communication network exchanges additional active N1 signaling with the wireless user device over the active N1 signaling links.

20 Claims, 10 Drawing Sheets

(58) Field of Classification Search
USPC .......................... 455/434, 422.1, 435.1, 418
See application file for complete search history.

(56) References Cited

U.S. PATENT DOCUMENTS

| | | |
|---|---|---|
| 10,687,300 B2 | 6/2020 | Youn et al. |
| 10,779,254 B2 | 9/2020 | Lee et al. |
| 11,582,709 B2 * | 2/2023 | Bertz .................. H04W 60/005 |
| 2018/0262924 A1 | 9/2018 | Dao et al. |
| 2019/0021064 A1 | 1/2019 | Ryu et al. |
| 2019/0174449 A1 | 6/2019 | Shan et al. |
| 2020/0162898 A1 | 5/2020 | Nair |
| 2020/0178076 A1 | 6/2020 | Ben Henda et al. |
| 2020/0178196 A1 | 6/2020 | Wang et al. |
| 2021/0068067 A1 | 3/2021 | Natarajan et al. |
| 2021/0127236 A1 * | 4/2021 | Mansour ............. H04W 64/003 |

OTHER PUBLICATIONS

NEC; "NAS security conference call notes"; 3GPP TSG SA WG3 (Security) Meeting #90; Jan. 22, 2018; 7 pages; S3-180008; 3GPP; Gothenburg, Sweden.

* cited by examiner

WIRELESS COMMUNICATION SERVICE DELIVERY TO USER EQUIPMENT (UE) USING AN ACCESS AND MOBILITY MANAGEMENT FUNCTION (AMF)

RELATED CASES

This United States Patent Application is a continuation of U.S. patent application Ser. No. 17/203,227 that was filed on Mar. 16, 2021 and is entitled "WIRELESS COMMUNICATION SERVICE DELIVERY TO USER EQUIPMENT (UE) USING AN ACCESS AND MOBILITY MANAGEMENT FUNCTION (AMF)." U.S. patent application Ser. No. 17/203,227 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), Interworking functions (IWFs), User Plane Functions (UPFs), Policy Control Functions (PCFs), Uniform Data Repositories (UDRs), Network Exposure Functions (NEFs), and the like.

The wireless communication networks comprise user-planes that carry user data and control-planes that control the user-planes by the transfer of network signaling. A typical user-plane comprises a wireless user device, wireless access node, IWF, and UPF. A typical control-plane comprises the wireless user device, wireless access node, IWF—and also an AMF and SMF. The control-plane in the wireless communication network and the control-plane in the wireless user devices communicate over signaling links like N1. The N1 signaling links are used for user authentication, authorization, messaging, and other services. For example, wireless user devices and network AMFs use N1 signaling to perform Access Traffic Steering, Switching, and Splitting (ATSSS) operations.

At present, an AMF in the control-plane is limited to two N1 signaling links per wireless user device, although additional N1 options are often available to the wireless user device. The wireless user device and the AMF may stop using an active N1 signaling link and start using one of these N1 options by performing an AMF deregistration and re-registration. Unfortunately, the AMF deregistration and re-registration requires additional user reauthentication and reauthorization. Moreover, a huge amount of network signaling is needed to continuously reauthenticate and reauthorize the same user for the AMF de-registrations and re-registrations which are required to support ATSSS operations.

TECHNICAL OVERVIEW

A wireless communication network serves a wireless user device using N1 signaling. The wireless communication network establishes active N1 signaling links with the wireless user device and exchanges active N1 signaling with the wireless user device over the active N1 signaling links. The wireless communication network converts one of the active N1 signaling links for the wireless user device into an inactive N1 signaling link and exchanges inactive N1 signaling with the wireless user device to maintain the inactive N1 signaling link. The wireless communication network converts the inactive N1 signaling link for the wireless user device back into the one of the active N1 signaling links without performing a new registration for the wireless user device. The wireless communication network exchanges additional active N1 signaling with the wireless user device over the active N1 signaling links.

An Access and Mobility Management Function serves a wireless user device using N1 signaling. The AMF performs registrations for the wireless user device, and in response, establishes active N1 signaling links with the wireless user device. The AMF converts one of the active N1 signaling links for the wireless user device into an inactive N1 signaling link and exchanges inactive N1 signaling with the wireless user device to maintain the registration for the inactive N1 signaling link. The AMF converts the inactive N1 signaling link for the wireless user device into the one of the active N1 signaling links based on the registration and the inactive N1 signaling for the wireless user device. The AMF exchanges additional active N1 signaling with the wireless user device over the active N1 signaling links.

A wireless network core serves a wireless user device using N1 signaling. A Network Function Virtualization Infrastructure (NFVI) is to execute an Access and Mobility Management Function (AMF) Virtual Network Function (VNF). The AMF VNF is to perform registrations for the wireless user device, and in response, establish active N1 signaling links with the wireless user device. The AMF VNF is to convert one of the active N1 signaling links for the wireless user device into an inactive N1 signaling link and exchange inactive N1 signaling with the wireless user device to maintain the registration for the inactive N1 signaling link. The AMF VNF is to convert the inactive N1 signaling link for the wireless user device into the one of the active N1 signaling links based on the registration and the inactive N1 signaling for the wireless user device. The AMF VNF is to exchange additional active N1 signaling with the wireless user device over the active N1 signaling links.

DETAILED DESCRIPTION

Figure 1:
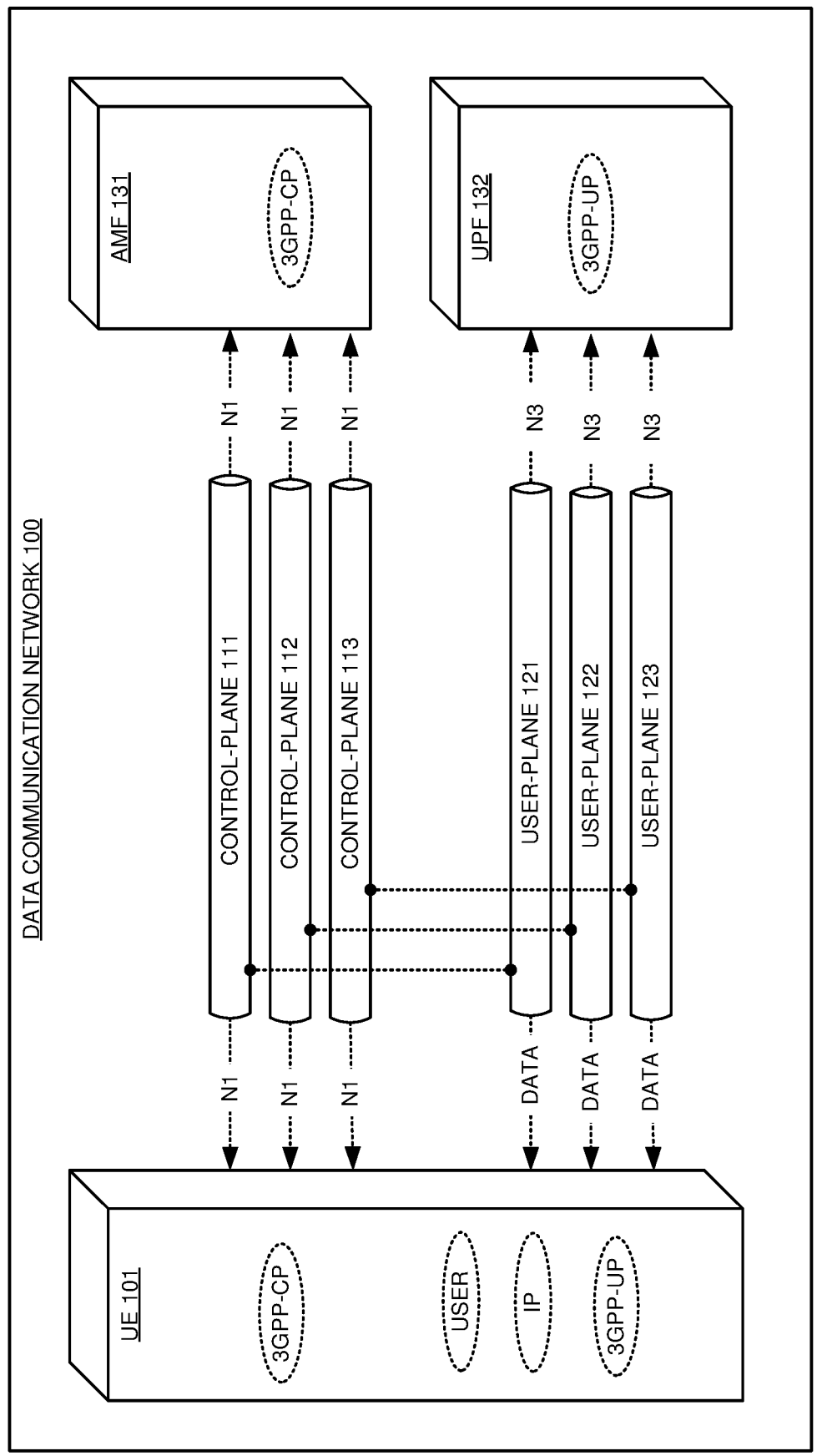
FIG. 1 illustrates a data communication network to serve a User Equipment (UE) using an Access and Mobility Management Function (AMF).

FIG. 1 illustrates data communication network 100 serve User Equipment (UE) 101 using Access and Mobility Management Function (AMF) 131. UE 101 comprises a computer, phone, vehicle, sensor, robot, or some other data appliance with wireless and/or wireline communication circuitry. Data communication network 100 delivers services to UE 101 like internet-access, machine communications, media-streaming, or some other data communications product. Data communication network 100 comprises UE 101, network control-planes 111-113, network user-planes 121-123, AMF 131, and User Plane Function (UPF) 132. UE 101 comprises user applications (USER), Third Generation Partnership Project Control-Plane Applications (3GPP CP), 3GPP User Plane Applications (3GPP UP), and Internet Protocol Applications (IP). AMF 131 comprises 3GPP CP, and UPF 132 comprises 3GPP UP. Control-planes 111-113 direct the operation of respective user-planes 121-123 though network signaling. User-planes 121-123 transfer user data in response to the network signaling. User-planes 121-123 comprise both 3GPP user-planes and non-3GPP user-planes. The amount of UEs, control-planes, user-planes, AMFs, and UPFs has been restricted for clarity, and data communication network 100 typically includes many more UEs, control-planes, user-planes, AMFs, and UPFs.

Various examples of network operation and configuration are described herein. In some examples, UE 101 and AMF 131 establish a first active registration with AMF 131 over control plane 111 and responsively establish an active N1. UE 101 and AMF 131 establish a second active registration with AMF 131 over control plane 112 and responsively establish another active N1. AMF 131 and UE 101 deactivate the second active registration for UE 101. UE 101 and AMF 131 establish a third active registration. The establishment of the active registrations entail the authentication and authorization of UE 101 by AMF 131. AMF 131 and UE 101 exchange active N1 signaling for the first active registration and the third active registration. AMF 131 and UE 101 also exchange the inactive N1 signaling for the second inactive registration. The inactive N1 signaling may be encapsulated within the active N1 signaling. The inactive N1 signaling may be used along with the active N1 signaling for steering, switching, and splitting.

Subsequently, AMF 131 and UE 101 deactivate the third active registration based on the active N1 signaling and the inactive N1 signaling. AMF 131 and UE 101 also reactivate the second inactive registration based on the active N1 signaling and the inactive N1 signaling. AMF 131 does not reauthenticate or reauthorize UE 101 during the reactivation of the second inactive registration when UE 101 has used its inactive N1 to maintain its original authentication and authorization for user-plane 122. This change from the third registration back to the second registration can be based on the performance of all three user-planes 121-123 may be to: 1) steer some user traffic from one user-plane to another based on performance, 2) switch all user traffic from one user-plane to another for a handover, or 3) split user traffic across aggregated user-planes. AMF 131 and UE 101 now exchange active N1 signaling for the first active registration and the second active registration. AMF 131 and UE 101 also exchange inactive N1 signaling for the third inactive registration. Subsequently, AMF 131 and UE 101 may deactivate the first or second active registrations and reactivate the third inactive registration based on the active N1 signaling and the inactive N1 signaling.

Advantageously, UE 101 and AMF 131 effectively use more than two N1 signaling links at a time. Moreover, UE 101 and AMF 131 efficiently perform ATSSS operations using more than two N1 signaling links.

UE 101 communicates with network control planes 111-113 and network user planes 121-123 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), IEEE 802.3 (ENET), Bluetooth, Narrowband Internet-of-Things (NB-IoT), and/or some other networking protocol. The wireless communication technologies use electromagnetic frequencies in the low-band, mid-band, highband, or some other portion of the electromagnetic spectrum. The communication links that support these technologies use metallic links, glass fibers, radio channels, or some other communication media. The communication links use ENET, Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols.

UE 101, control-planes 111-113, and user-planes 121-123 comprise antennas, amplifiers, filters, modulation, analog/digital interfaces, microprocessors, software, memories, transceivers, bus circuitry, and the like. AMF 131 and UPF 132 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

User-planes 121-123 may comprise: 5GNR gNodeBs, LTE eNodeBs, non-3GPP Access Nodes (ANs), non-3GPP Interworking Functions (IWFs), UPFs, and/or some other network elements that handle user data. Control-planes 111-113 may comprise: gNodeBs, eNodeBs, IWFs, CAARs, 3GPP Access and Mobility Management Functions (AMFs), Session Management Functions (SMFs), Policy Control Functions, (PCFs), Uniform Data Repositories (UDRs) and/or some other network elements that control user planes 121-123 with network signaling. AMF 131 could be integrated into one of control planes 111-113. UPF 132 could be integrated into one of user planes 121-123.

Figure 2:
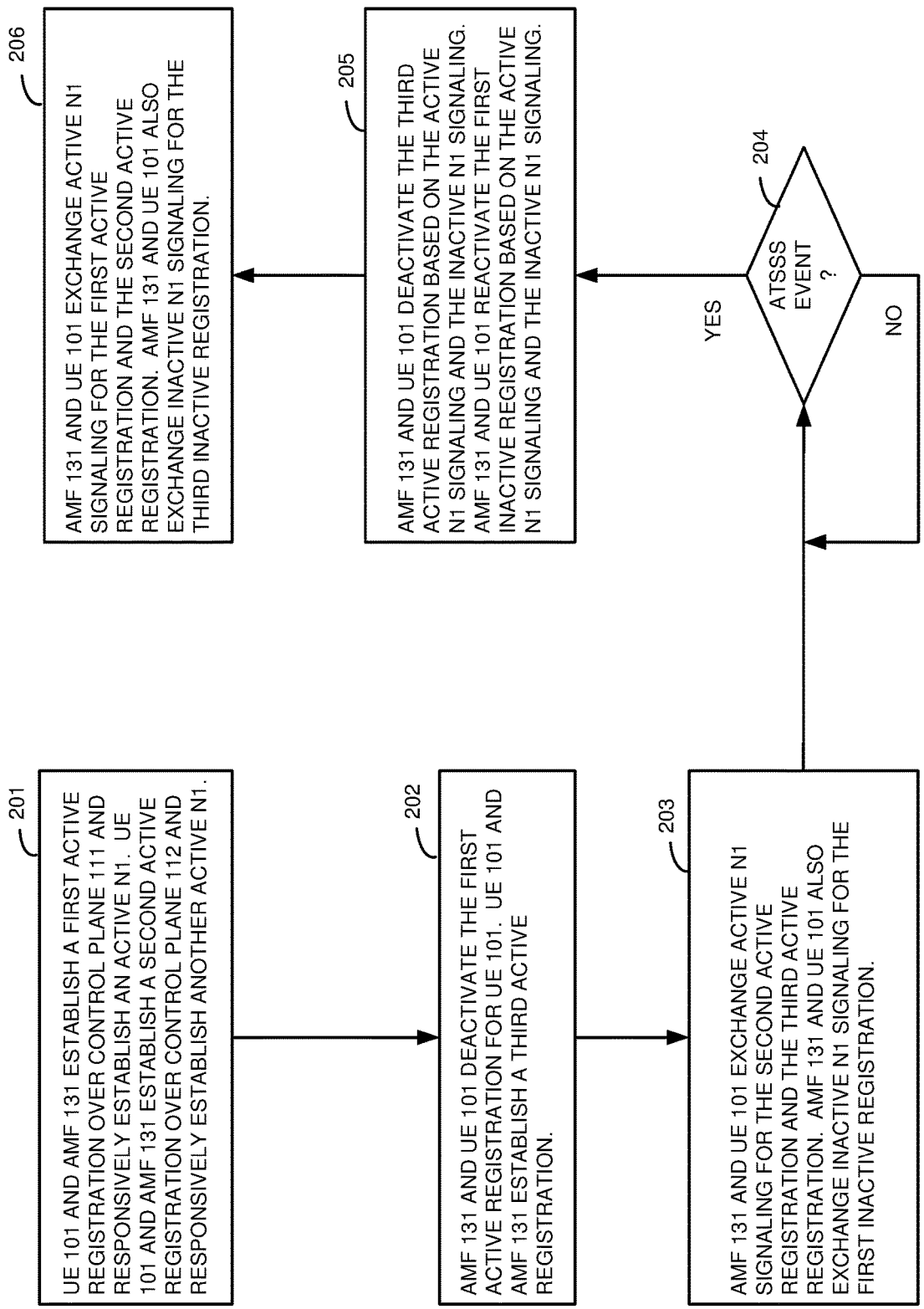
FIG. 2 illustrates an exemplary operation of the data communication network to serve the UE using the AMF.

FIG. 2 illustrates an exemplary operation of data communication network 100 to serve UE 101 using AMF 131. The operation may differ in other examples. UE 101 and AMF 131 establish a first active registration over control plane 111 and responsively establish an active N1 (201). UE 101 and AMF 131 establish a second active registration over control plane 112 and responsively establish another active N1 (201). AMF 131 and UE 101 deactivate the first active registration (202). UE 101 and AMF 131 establish a third active registration (202). AMF 131 and UE 101 exchange active N1 signaling for the second active registration and the third active registration (203). AMF 131 and UE 101 also exchange inactive N1 signaling for the first inactive registration (203). AMF 131 and UE 101 monitor the active N1s and the inactive N1 for Access Traffic Steering, Switching, Splitting (ATSSS) events for user planes 121-123 (204). When an ATSSS event is detected for event for user planes 121-123 (204), AMF 131 and UE 101 deactivate the third active registration based on the active N1 signaling and the inactive N1 signaling (204). AMF 131 and UE 101 reactivate the first inactive registration based on the active N1 signaling and the inactive N1 signaling (204). AMF 131 and UE 101 exchange active N1 signaling for the first active registration and the second active registration (205). AMF 131 and UE 101 also exchange inactive N1 signaling for the third inactive registration (205).

Figure 3:
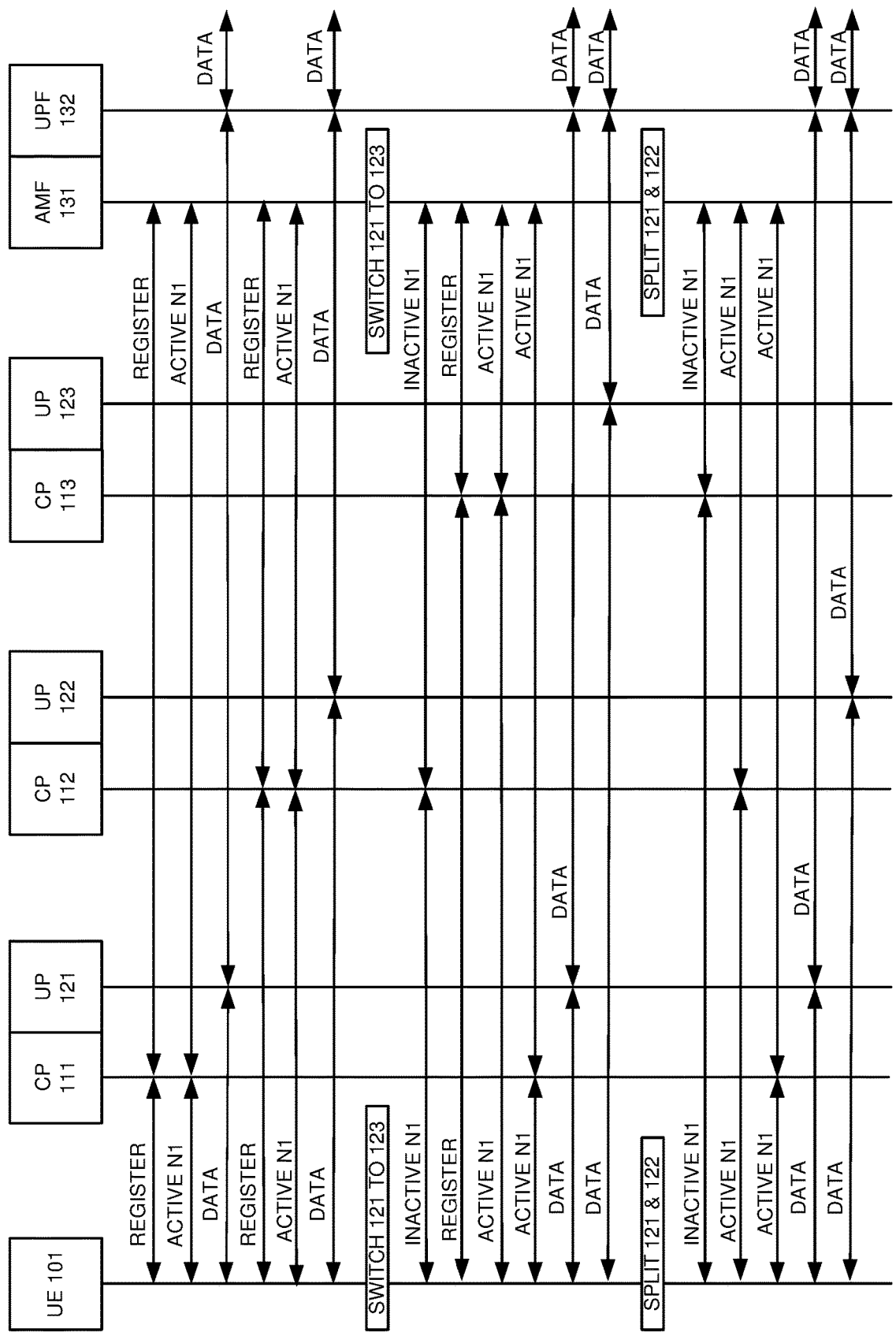
FIG. 3 illustrates an exemplary operation of the data communication network to serve the UE using the AMF.

FIG. 3 illustrates another exemplary operation of data communication network 100 to serve UE 101 using AMF 131. The operation may differ in other examples. UE 101 and AMF 131 establish a first active registration with AMF 131 over control-plane (CP) 111. AMF 131 authenticates and authorizes UE 101 during the first active registration. UE 101 and AMF 131 establish an active N1 over control-plane 111. UE 101 and UPF 132 may exchange user data over user-plane (UP) 121.

UE 101 and AMF 131 establish a second active registration with AMF 131 over control-plane 112. AMF 131 authenticates and authorizes UE 101 during the second active registration. UE 101 and AMF 131 establish a second active N1 over control-plane 112. UE 101 and UPF 132 may exchange user data over user-plane 122.

UE 101 and AMF 131 determine to switch user data from user-plane 121 and to user-plane 123 in response to UE mobility. UE 101 and AMF 131 deactivate the N1 for the second active registration for user-plane 122, and the second active registration becomes the second inactive registration with an inactive N1. UE 101 and AMF 131 establish a third active registration over control-plane 113. AMF 131 authenticates and authorizes UE 101 during the third active registration. UE 101 and AMF 131 establish an active N1 over control-plane 113. UE 101 and UPF 132 may exchange user data over user-plane 123. AMF 131 and UE 101 exchange active N1 signaling for the first active registration over control-plane 111. AMF 131 and UE 101 exchange active N1 signaling for the third active registration over control-plane 113. AMF 131 and UE 101 exchange inactive N1 signaling for the second inactive registration over control-plane 111 and/or control-plane 113. UE 101 and UPF 132 may exchange user data over user-planes 121 and 123.

UE 101 and AMF 131 determine to split user data across user-plane 121 and user-plane 122 based on the performance of all three user-planes 121-123. In response, UE 101 and AMF 131 deactivate the N1 for the third active registration and user-plane 123, and the third active registration becomes the third inactive registration with an inactive N1. UE 101 and AMF 131 reactivate the second registration over control-plane 112 and re-establish its active N1, and the second inactive registration becomes the second active registration with an active N1. AMF 131 does not reauthenticate or reauthorize UE 101 during the reactivation of the second registration since UE 101 has properly used its inactive N1 to maintain the authentication and authorization for user-plane 122. UE 101 and AMF 131 reestablish an active N1 over control-plane 112. UE 101 and UPF 132 may exchange user data over user-plane 122. AMF 131 and UE 101 exchange active N1 signaling for the first active registration over control-plane 111. AMF 131 and UE 101 exchange active N1 signaling for the second active registration over control-plane 112. AMF 131 and UE 101 also exchange inactive N1 signaling for the third inactive registration over control-plane 111 and/or control-plane 112. UE 101 and UPF 132 may exchange user data over user-planes 121 and 122.

Figure 4:
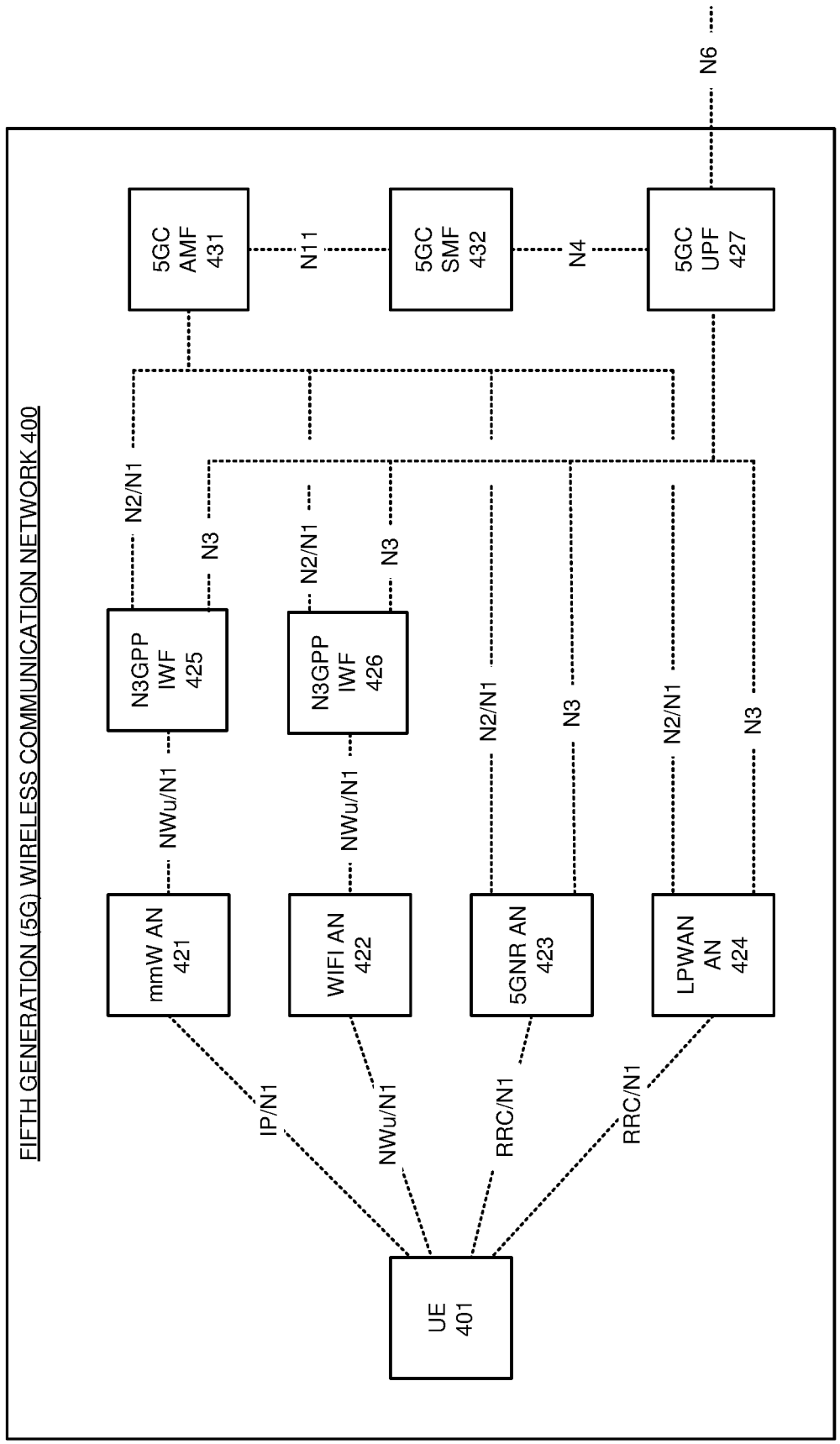
FIG. 4 illustrates a Fifth Generation (5G) wireless communication network to serve a UE using an AMF.

FIG. 4 illustrates Fifth Generation (5G) wireless communication network 400 to serve UE 401 using AMF 431. 5G wireless communication network 400 comprises an example of data communication network 100, although network 100 may vary from this example. 5G communication network 400 comprises UE 401, Millimeter Wave (mmW) Access Node (AN) 421, IEEE 802.11 (WIFI) AN 422, Fifth Generation New Radio (5GNR) AN 423, and Low-Power Wide Area Network (LP WAN) AN 424, non-3GPP Interworking Functions (IWF) 425-426, Fifth Generation Core (5GC) User Plane Function (UPF) 427, 5GC Access and Mobility Management Function (AMF) 431, 5GC Session Management Function (SMF) 432. Other network elements like Policy Control Function (PCF), Uniform Data Repository (UDR), Network Exposure Function (NEF), and the like are typically included but are omitted for clarity. Additional SMFs and UPFs could be used as well. For example, N3GPP IWF 425 could be linked to external systems over a different UPF than UPF 427, or LP WAN AN 423 could be linked to external systems over a different UPF and SMF than UPF 427 and SMF 432. Four different network user planes are formed by: 1) UE 401, mmW AN 421, IWF 425, and UPF 427, 2) UE 401, WIFI AN 422, IWF 426, and UPF 427, 3) UE 401, 5GNR AN 423, and UPF 427, and 4) UE 401, LP WAN AN 424, and UPF 427. Four different network control planes are formed by: 1) UE 401, mmW AN 421, IWF 425, AMF 431, and SMF 432, 2) UE 401, WIFI AN 422, IWF 426, AMF 431, and SMF 432, 3) UE 401, 5GNR AN 423, AMF 431, and SMF 432, and 4) UE 401, LP WAN AN 424, AMF 431, and SMF 432.

UE 401 and AMF 431 establish a first active registration over mmW AN 421 and N3GPP IWF 425 and responsively establish an active N1. UE 401 and AMF 431 establish a second active registration over WIFI AN 422 and N3GPP IWF 426 and responsively establish a second active N1. The particular order used for these registrations is exemplary and other orders could be used. Both active registrations entail the authentication of UE 401 by AMF 431—typically by comparing hashes of a UE ID. Both active registrations entail the authorization of UE 401 by AMF 431—typically by dipping a subscriber database with the authentic UE ID to identify currently available services for UE 401.

To build the group of N1s for UE 401, AMF 431 and UE 401 deactivate the second active registration for UE 401 over WIFI AN 422 and N3GPP IWF 426 and establish a third active registration over 5GNR AN 423. AMF 431 and UE 401 exchange active N1 signaling for the first active registration over mmW AN 421 and N3GPP IWF 425. AMF 431 and UE 401 exchange active N1 signaling for the third active registration over 5GNR AN 423. AMF 431 and UE 401 also exchange inactive N1 signaling for the second inactive registration for WIFI AN 422 and N3GPP IWF 426, but AMF 431 and UE 401 exchange the inactive N1 signaling over one of the active N1 signaling links. For example, AMF 431 and UE 401 may mark inactive N1 signaling packets as inactive and then encapsulate the marked inactive N1 signaling packets within the active N1 signaling packets. AMF 431 and UE 401 then transfer the marked and encapsulated inactive N1 signaling packets within active N1 signaling packets that traverse the active N1 over mmW AN 421 and N3GPP IWF 425 and/or the other active N1 over 5GNR AN 423.

To further build the group of N1s for UE 401, AMF 431 and UE 401 deactivate the third active registration for UE 401 over 5GNR AN 423. UE 401 and AMF 431 establish a fourth active registration over LP WAN AN 424. AMF 431 and UE 401 exchange active N1 signaling for the first active registration over mmW AN 421 and N3GPP IWF 425. AMF 431 and UE 401 exchange active N1 signaling for the fourth active registration over LP WAN AN 424. AMF 431 and UE 401 also exchange inactive N1 signaling for the second inactive registration (WIFI AN 422 and N3GPP IWF 426) and the third inactive N1 registration (5GNR AN 423) over the active N1 signaling that traverses mmW AN 421 and N3GPP IWF 425 and/or LP WAN AN 424.

UE 401 and AMF 431 use N1 information from both the active and inactive N1s to perform Access Traffic Steering, Switching, and Splitting (ATSSS). Thus, AMF 431 has continuous N1 data for all four user planes to use when selecting which two user planes and N1s should be active and which two user planes and N1s should be inactive. To switch traffic from a source user plane to target user plane, the active N1 for the source user-plane is deactivated and the inactive N1 for the target user plane is activated. The target user plane now carries user traffic. The inactive N1 signaling for the source user plane is now encapsulated within the active N1 of the target user plane or the other active user plane. To steer traffic away from poorly-performing user planes to a better-performing user plane, the active N1 for one of the poorly-performing user-planes is deactivated, and the inactive N1 for the better-performing user plane is activated. User traffic is steered away from the poorly-performing user plane and toward the better-performing user plane to improve service. The inactive N1 signaling for the deactivated and poorly-performing user plane is now encapsulated within the active N1s of the now better-performing user planes. To split traffic across aggregated user planes, the active N1s for the two non-aggregated user planes are deactivated if they were active, and the N1s for the two aggregated user-planes are reactivated if they were inactive. The inactive N1 signaling for the inactive user planes is now encapsulated within the active N1s of the aggregated user planes.

To deactivate an N1, UE 401 and AMF 131 mark the N1 signaling packets as inactive and encapsulate them within active N1 signaling packets. The encapsulated inactive signaling packets are decapsulated based on the inactive mark and handled by an inactive N1 signaling terminator that does not otherwise inhibit the active N1 signaling operations. The inactive N1 is used to transfer status information, make user requests, and maintain authentication and authorization for the inactive N1 through the inactive period. To reactivate an N1, UE 401 and AMF 131 stop marking the N1 signaling packets as inactive and stop encapsulating the active N1 signaling packets. The active N1 signaling packets now traverse their own user plane and may encapsulate other inactive N1 signaling packets. The active N1 packets are handled by an active N1 signaling terminator. The active N1 terminator and the inactive N1 terminator both transfer N1 status information to AMF 431 for ATSSS operations.

When an inactive N1 is able to maintain its original authentication and authorization with AMF 431 through an inactive period, AMF 131 does not reauthenticate or reauthorize UE 401 when the N1 is reactivated. Thus, AMF 431 and UE 401 do not rehash and re-compare the rehashes for UE 401. For N1 registration reactivation, AMF 431 and UE 401 do not re-access the subscriber database to identify currently available services for UE 401. Thus, UE 401 and AMF 431 may use a large number of N1s without excessive reauthentication and reauthorization.

AMF 431 may advertise its enhanced N1 registration capability in System Information Blocks (SIBs) that are broadcast over at least some of ANs 421-424. UE 401 may report its enhanced N1 registration capability in UE capability messages that are signaled to AMF 431 over at least some of ANs 421-424. AMF 431 may update the Radio Resource Control (RRC) Inactive Assistance Information to reflect the currently active and inactive N1 registrations.

In some examples, UE 401 and AMF 431 use active Public Land Mobile Network Identifiers (PLMN IDs) for the active N1 registrations and use inactive PLMN IDs for the inactive PLMN registrations. Thus, UE 401 may receive a SIB that indicates the active/inactive PLMNs. UE 401 requests and uses the active PLMN IDs for the active N1s and requests and uses the inactive PLMN IDs for the inactive N1s. The inactive PLMN IDs could be fake.

Figure 5:
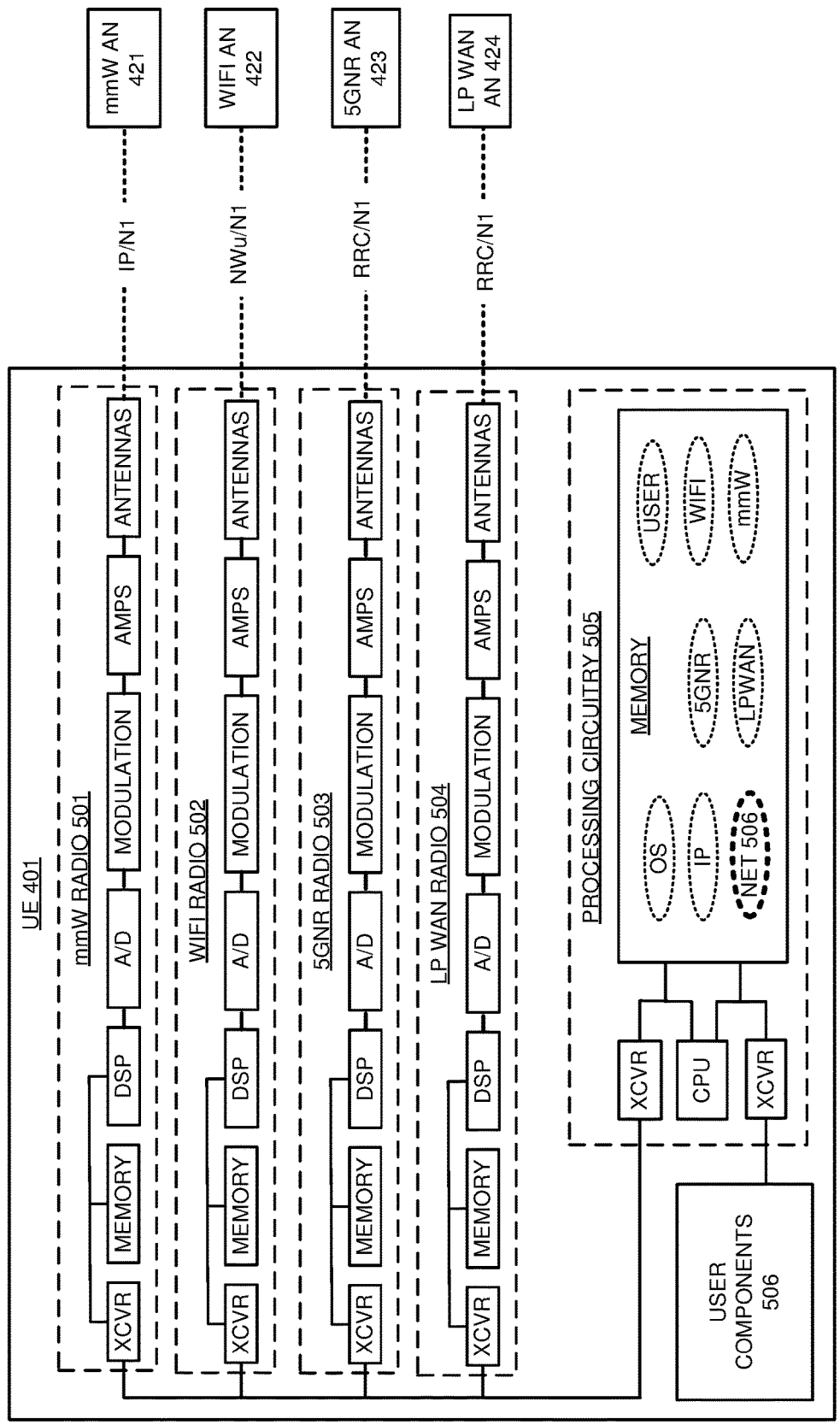
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises mmW radio 501, WIFI radio 502, 5GNR radio 503, LP WAN radio 504, processing circuitry 505, and user components 506. Radios 501-504 comprise antennas, amplifiers, filters, modulation, analog-to-digital interfaces, DSP, memory, and transceivers that are coupled over bus circuitry. Processing circuitry 505 comprises memory, CPU, user interfaces and components, and transceivers that are coupled over bus circuitry. The memory in processing circuitry 505 stores an operating system, user applications (USER), and network applications for IP, 5GNR, WIFI, LP WAN, mmW, and 3GPP networking (NET) 506. The network applications include physical layer, media access control, link control, convergence and adaption, radio resource control, and the like.

The antennas in mmW radio 501 are wirelessly coupled to mmW AN 421 over a mmW link that can transport an active N1 over IP. The antennas in WIFI radio 502 are wirelessly coupled to WIFI AN 422 over a WIFI link that can transport an active N1 over NWu. The antennas in 5GNR radio 503 are wirelessly coupled to 5GNR AN 423 over a 5GNR link that can transport an active N1 over RRC. The antennas in LP WAN radio 504 are wirelessly coupled to LP WAN AN 424 over an LP WAN link that can transport an active N1 over RRC. Transceivers in radios 501-504 are coupled to transceivers in processing circuitry 505. Transceivers in processing circuitry 505 are coupled to user components 506 like displays, controllers, and memory. The CPU in processing circuitry 505 executes the operating system, user applications, and network applications to exchange network signaling and user data with ANs 421-424 over respective radios 501-504.

3GPP networking 506 establishes a first active AMF registration over the mmW network applications, mmW radio 501, and mmW AN 421. During AMF registration, 3GPP networking 506 receives a random number over the mmW network applications, mmW radio 501, and mmW AN 421. 3GPP networking 506 retrieves a Subscriber Permanent Identifier (SUPI) UE 401 from the memory and hashes the random number with the SUPI to generate a result. 3GPP networking 506 transfers the result over the mmW network applications, mmW radio 501, and mmW AN 421 to perform authentication. After successful authentication and authorization, 3GPP networking 506 establishes an active N1 over the mmW network applications, mmW radio 501 and mmW AN 421. 3GPP networking 506 exchanges user data and N1 signaling over the mmW network applications, mmW radio 501 and mmW AN 421.

3GPP networking 506 establishes a second active AMF registration over the WIFI network applications, WIFI radio 502, and WIFI AN 422. During the second AMF registration, 3GPP networking 506 receives another random number over the WIFI applications, WIFI radio 502, and WIFI AN 422. 3GPP networking 506 hashes the other random number with the SUPI to generate another result. 3GPP networking 506 transfers the other result over the WIFI applications, WIFI radio 502, and WIFI AN 422 to perform another authentication. After successful authentication and authorization, 3GPP networking 506 establishes an active N1 over the WIFI applications, WIFI radio 502, and WIFI AN 422. 3GPP networking 506 exchanges user data and N1 signaling over the WIFI applications, WIFI radio 502, and WIFI AN 422.

To initially build N1s, 3GPP networking 506 transfers network signaling to deactivate the active mmW registration and mmW N1 and to establish an N1 for the 5GNR user plane. 3GPP networking 506 now transfers inactive N1 data for the mmW user plane over the active N1 for the WIFI user plane. 3GPP networking 506 then establishes a third active AMF registration over the 5GNR network applications, 5GNR radio 503, and 5GNR AN 423. During the third AMF registration, 3GPP networking 506 receives another random number over the 5GNR applications, 5GNR radio 503, and 5GNR AN 423. 3GPP networking 506 hashes the other random number with the SUPI to generate another result. 3GPP networking 506 transfers the other result over the 5GNR applications, 5GNR radio 503, and 5GNR AN 423 to perform another authentication. After successful authentication and authorization, 3GPP networking 506 establishes an active N1 over the 5GNR applications, 5GNR radio 503, and 5GNR AN 423. 3GPP networking 506 exchanges user data and N1 signaling over the 5GNR applications, 5GNR radio 503, and 5GNR AN 423. 3GPP networking 506 may transfer inactive N1 data for the mmW user plane over the active N1 for the 5GNR user plane.

To continue building N1s, 3GPP networking 506 transfers network signaling to deactivate the active 5GNR registration and 5GNR N1 and to establish an N1 for the LP WAN user plane. 3GPP networking 506 starts to transfer inactive N1 data for the mmW user plane and the 5GNR user plane over the active N1 for the WIFI user plane. 3GPP networking 506 then establishes a fourth active AMF registration over the LP WAN network applications, LP WAN radio 504, and LP WAN AN 424. During the fourth AMF registration, 3GPP networking 506 receives another random number over the LP WAN applications, LP WAN radio 504, and LP WAN AN 424. 3GPP networking 506 hashes the other random number with the SUPI to generate another result. 3GPP networking 506 transfers the other result over the LP WAN applications, LP WAN radio 504, and LP WAN AN 424 to perform another authentication. After successful authentication and authorization, 3GPP networking 506 establishes an active N1 over the LP WAN applications, LP WAN radio 504, and LP WAN AN 424. 3GPP networking 506 exchanges user data and N1 signaling over the LP WAN applications, LP WAN radio 504, and LP WAN AN 424. 3GPP networking 506 may transfer inactive N1 data for the mmW user plane and the 5GNR user plane over the active N1s for the WIFI user plane and the LP WAN user plane.

To transfer inactive N1 signaling, 3GPP networking 506 adds an inactive mark to the inactive N1 signaling packets. 3GPP networking 506 then encapsulate the marked inactive N1 signaling packets within active N1 signaling packets. 3GPP networking 506 then transfers the active N1 signaling packets over their active user planes. The active N1 signaling packets carry the inactive N1 signaling packets for the inactive user planes. To receive inactive N1 signaling, 3GPP networking 506 decapsulates the inactive N1 signaling packets from the active N1 signaling packets based on the inactive marks.

3GPP networking 506 uses N1 information from both the active and inactive N1s to perform Access Traffic Steering, Switching, Splitting (ATSSS). Based on ATSSS rules, active N1 data, and inactive N1 data, 3GPP 506 maintains two active user planes and two active N1s. 3GPP 506 also maintains two inactive user planes and two inactive N1s. When 3GPP 506 maintains an inactive N1 link through its inactive periods by periodic signaling, handshakes, and the like, then 3GPP 506 does not have to get UE 401 reauthenticated and reauthorized to reactivate the user planes and the N1s.

3GPP networking 506 may receive network broadcasts that advertise the enhanced N1 registration capability. 3GPP networking 506 may report its enhanced N1 registration capability in UE capability messages that are signaled during wireless network attachment. In some examples, 3GPP networking 506 uses active PLMN IDs for the active N1 registrations and uses inactive PLMN IDs for the inactive PLMN registrations.

Figure 6:
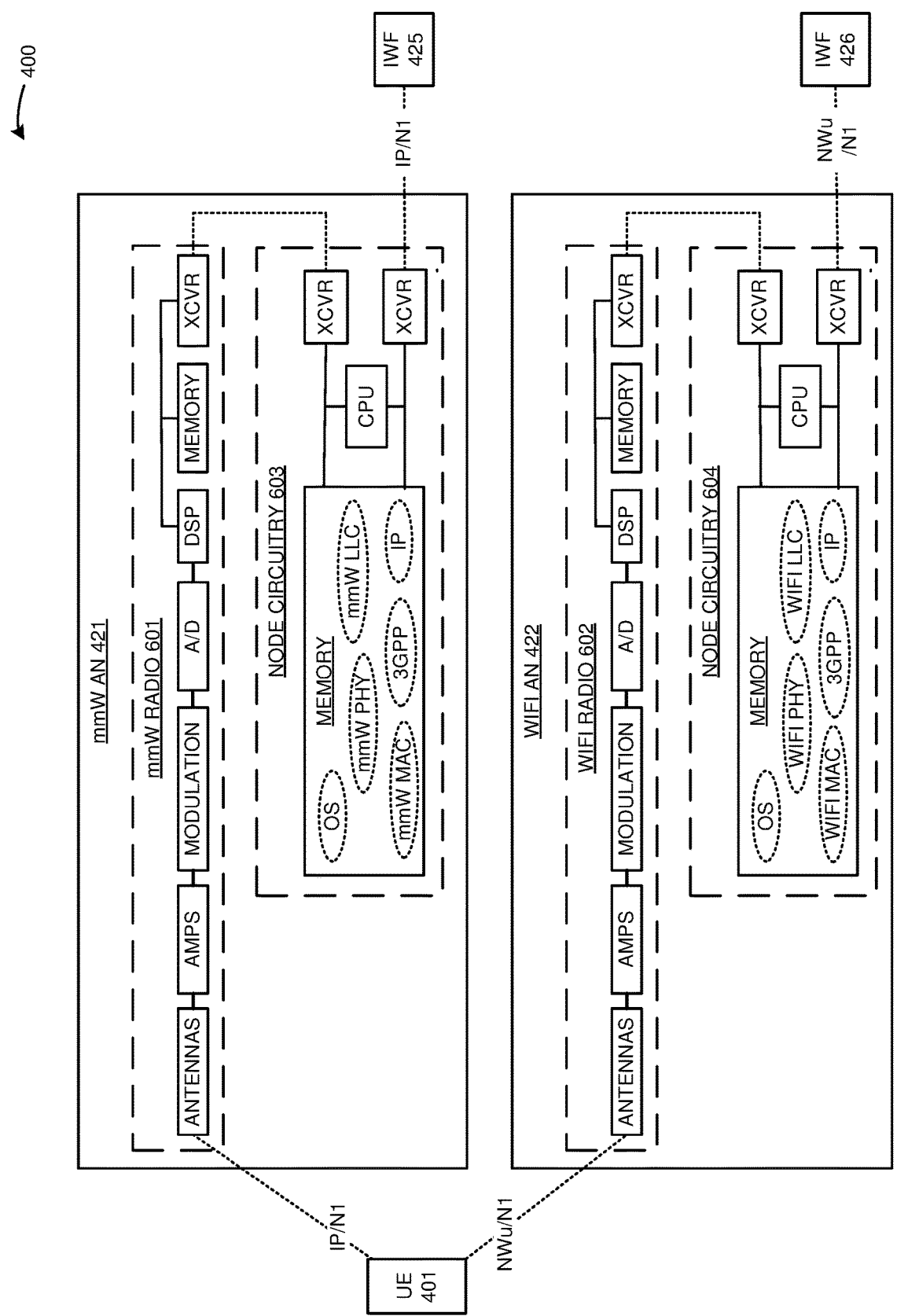
FIG. 6 illustrates a Millimeter Wave Access Node (mmW AN) and an IEEE 802.11 Access Node (WIFI AN) in the 5G wireless communication network.

FIG. 6 illustrates Millimeter Wave Access Node (mmW AN) 421 and an IEEE 802.11 Access Node (WIFI AN) 422 in 5G wireless communication network 400. ANs 421-422 comprise an example of control-planes 111-113 and user planes 121-123, although control-planes 111-113 and user planes 121-123 may differ. WIFI AN 422 comprises WIFI radio 602 and node circuitry 604, and mmW access node 421 comprises mmW radio 601 and node circuitry 603. Radios 601-602 comprise antennas, amplifiers, filters, modulation, analog-to-digital interfaces, DSP, memory, and transceivers that are coupled over bus circuitry. Node circuitry 603-604 comprises memory, CPU, and transceivers that are coupled over bus circuitry. The memory in node circuitry 603-604 stores operating systems and network applications. In mmW AN 421, the network applications comprise mmW PHY, mmW MAC, mmW LLC, IP, and 3GPP Networking (3GPP). In WIFI AN 422, the network applications comprise WIFI PHY, WIFI MAC, WIFI LLC, IP, and 3GPP.

The antennas in mmW radio 601 are wirelessly coupled to UE 401 over wireless links that support N1 over IP. Transceivers in mmW radio 601 are coupled to transceivers in node circuitry 603, and transceivers in node circuitry 603 are coupled to transceivers in IWF 425 over links that support N1 signaling over IP. The CPU in node circuitry 603 executes the operating system and mmW applications to exchange data and signaling with UE 401 over the wireless mmW link and to exchange data and signaling with IWF 425.

The antennas in WIFI radio 602 are wirelessly coupled to UE 401 over wireless links that support N1 over NWu. Transceivers in WIFI radio 602 are coupled to transceivers in node circuitry 604, and transceivers in node circuitry 604 are coupled to transceivers in IWF 425 over links that support N1 signaling over NWu. The CPU in node circuitry 604 executes the operating system and WIFI applications to exchange data and signaling with UE 401 over the wireless WIFI link and to exchange data and signaling with IWF 426.

Figure 7:
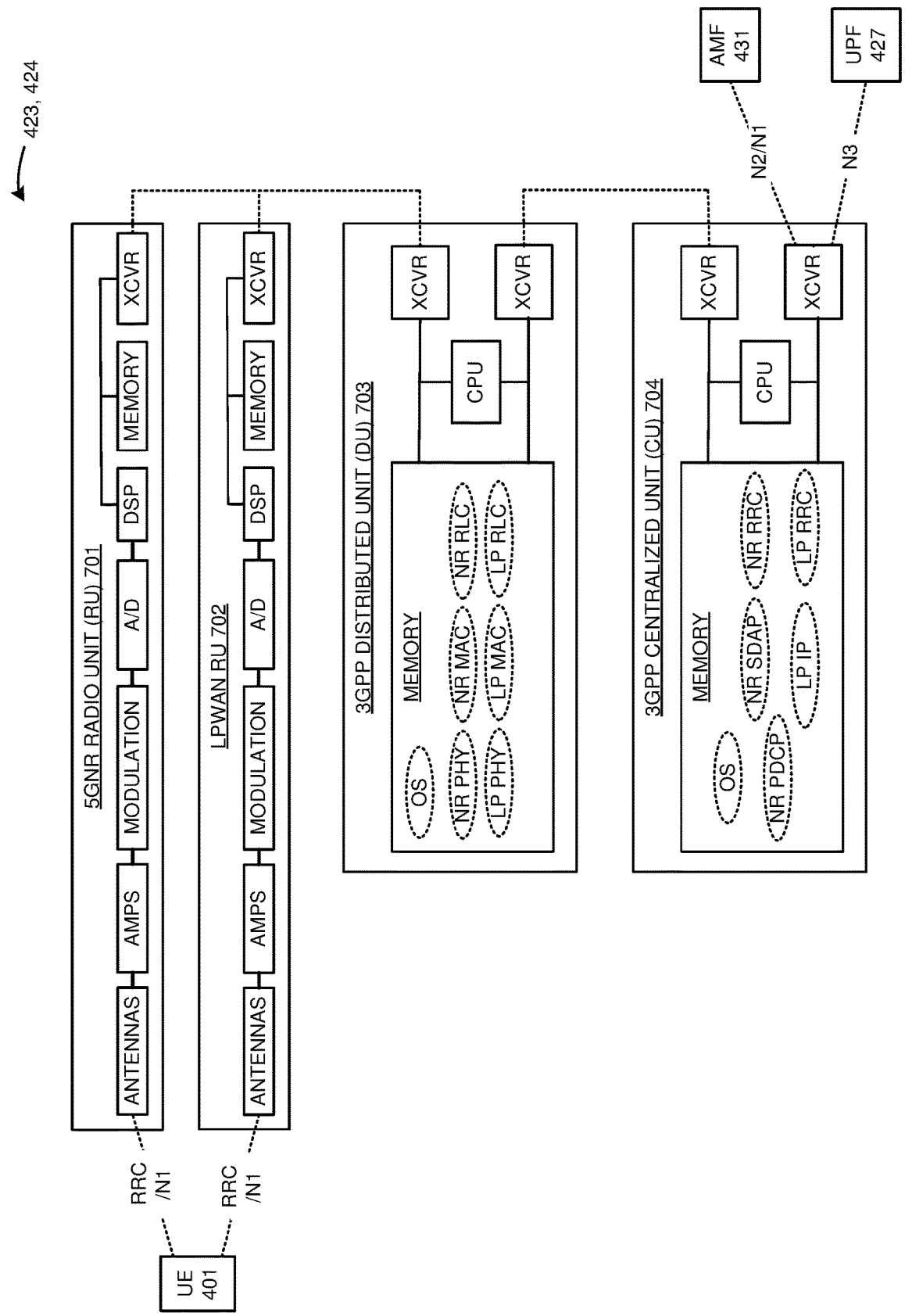
FIG. 7 illustrates Fifth Generation New Radio (5GNR) AN and a Low Power Wide Area Network (LP WAN) AN in the 5G wireless communication network.

FIG. 7 illustrates Fifth Generation New Radio (5GNR) AN 423 and Low Power Wide Area Network (LP WAN) AN 424 in 5G wireless communication network 400. 5GNR AN 423 and LP WAN AN 424 comprises an example of control-planes 111-113 and user planes 121-123, although control-planes 111-113 and user planes 121-123 may differ. ANs 423-424 comprise 5GNR Radio Unit (RU) 701, LP WAN RU 702, 3GPP Distributed Unit (DU) 703, and 3GPP Centralized Unit (CU) 704. RUs 701-702 comprise antennas, amplifiers, filters, modulation, analog-to-digital interfaces, DSP, memory, and transceivers that are coupled over bus circuitry. DU 703 comprises memory, CPU, and transceivers that are coupled over bus circuitry. The memory in DU 703 stores operating systems and network applications like PHY, MAC, LLC, and RLC. CU 704 comprises memory, CPU, and transceivers that are coupled over bus circuitry. The memory in CU 704 stores an operating system and network applications like Packet Data Convergence Protocol (PDCP), Service Data Adaptation Protocol (SDAP), Radio Resource Control (RRC), and IP.

The antennas in 5GNR RU 701 are wirelessly coupled to UE 401 over 5GNR links that support N1 over RRC. The antennas in LP WAN RU 702 are wirelessly coupled to UE 401 over LP WAN links that support N1 over RRC. Transceivers in RUs 701-702 are coupled to transceivers in DU 703 over fronthaul links like enhanced Common Public Radio Interface (eCPRI). Transceivers in DU 703 coupled to transceivers in CU 704 over mid-haul links. Transceivers in CU 704 are coupled to AMFs 431 and UPF 427 over backhaul links. The CPU in DU 704 executes an operating system and network applications to exchange 5GNR and LP WAN data units with RUs 701-702 and to exchange 5GNR and LP data units with CU 704. The CPU in CU 704 executes an operating system and network applications to exchange N2/N1 signaling with AMF 431 and N3 data with UPF 427.

Figure 8:
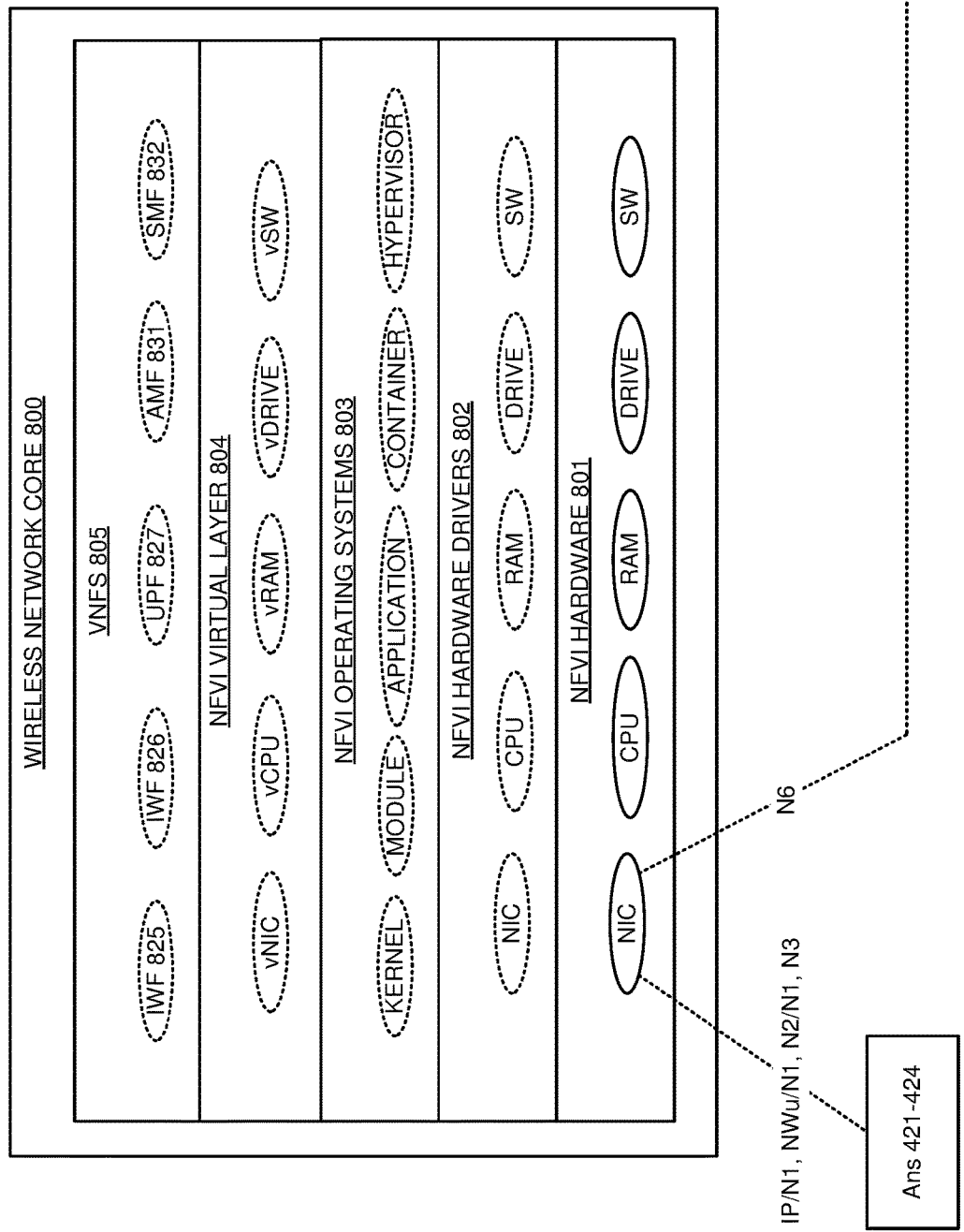
FIG. 8 illustrates a wireless network core comprising the AMF in the wireless communication network.

FIG. 8 illustrates wireless network core 800 comprising AMF 431 in 5G wireless communication network 400. Network core 800 comprises an example of AMF 131 and UPF 132, although AMF 131 and UPF 132 may differ. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise non-3GPP IWF 825, non-3GPP IWF 826, UPF 827, AMF 831, and Other VNFs like Policy Control Functions (PCF), Authentication Server Function (AUSF), and Network Repository Function (NRF) are typically present but are omitted for clarity. Network core 800 may be located at a single site or be distributed across multiple geographic locations. The NIC in NFVI hardware 801 are coupled to ANs 421-424 over data links that support IP, NWu, N1, N2, N3, and N6. NFVI hardware 801 executes NFVI hardware drivers 802, NFVI operating systems 803, NFVI virtual layer 804, and NFVI VNFs 805 to form IWFs 425-426, UPF 427, AMF 431, and SMF 432.

Figure 9:
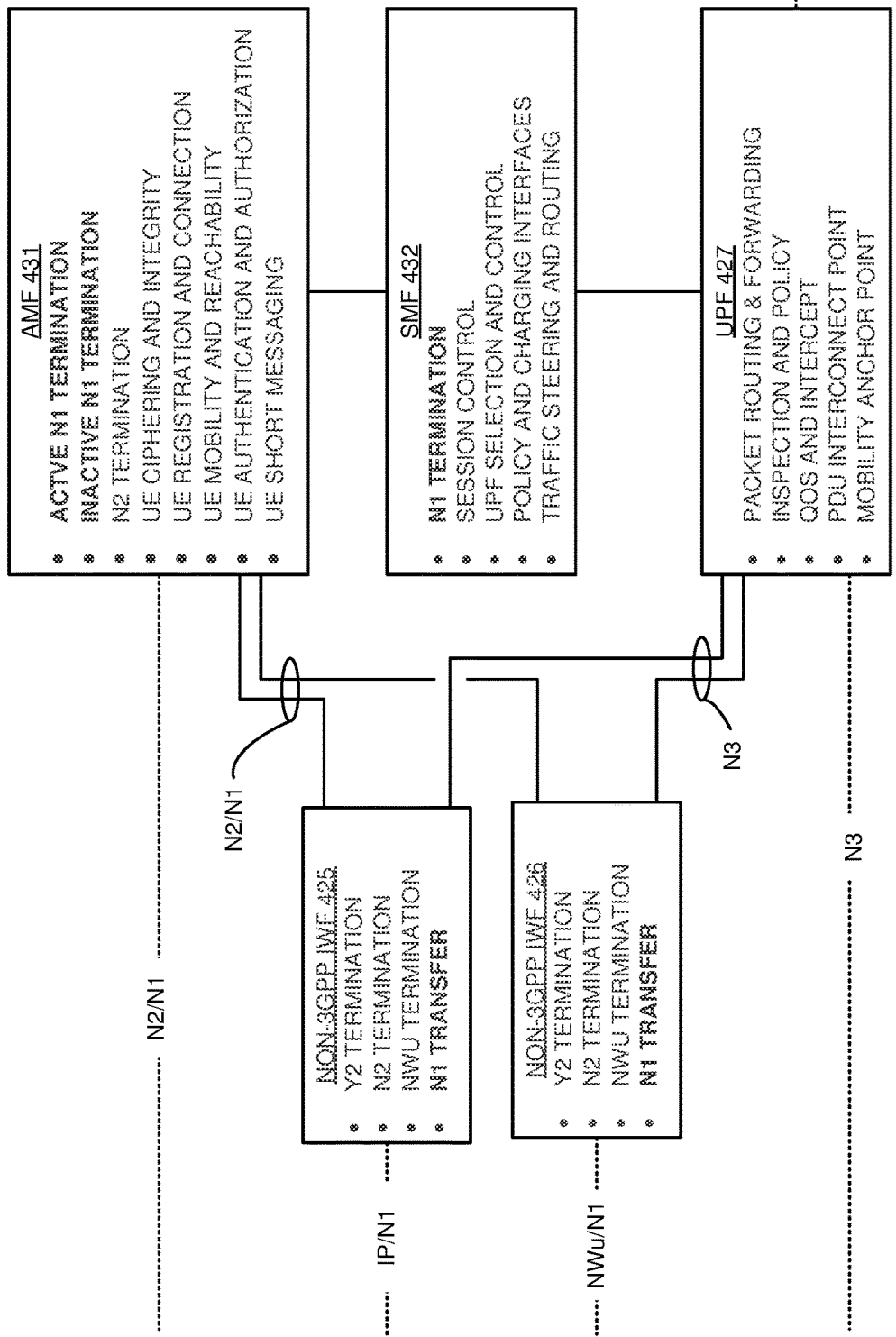
FIG. 9 further illustrates the wireless network core comprising the AMF in the 5G wireless communication network.

FIG. 9 further illustrates wireless network core 400 comprising AMF 431 in 5G wireless communication network 400. Non-3GPP IWFs 425-426 perform Y2 termination, N2 termination, NWu termination, and N1 transfer. UPF 427 performs packet routing & forwarding, packet inspection and policy, QoS handling and lawful intercept, PDL; interconnection, and mobility anchoring. AMF 431 performs active N1 termination, inactive N1 termination, N2 termination, LT ciphering & integrity protection, UE registration and connection, UE mobility and reachability, LT authentication and authorization, and UE short messaging. SMF 432 performs N1 termination, session establishment/management, UPF selection and control, policy and charging control, and traffic steering and routing.

Figure 10:
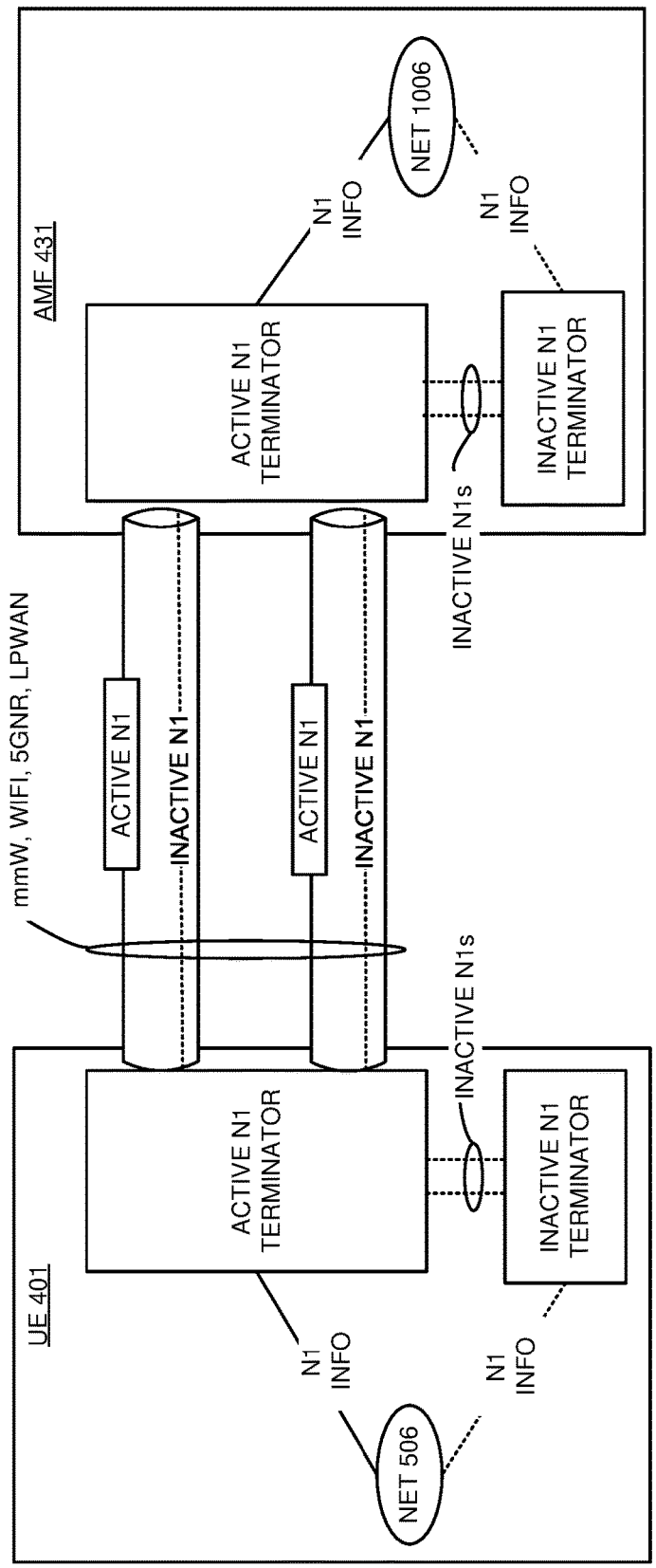
FIG. 10 illustrates the UE and the AMF in the 5G wireless communication network.

FIG. 10 illustrates UE 401 and AMF 431 in the 5G wireless communication network 400. UE 401 and AMF 431 establish two active registrations over at least one of mmW, WIFI, 5GNR, and LP WAN. UE 401 and AMF 431 establish two active N1s between their active N1 terminators responsive to the two registrations. The active registrations entail the authentication of UE 401 by AMF 431 by comparing hashes of a SUPI (or other ID) for UE 401. Both active registrations entail the authorization of UE 401 by AMF 431 by dipping a UDM to identify currently available services for authenticated UE 401. To build N1s for UE 401, AMF 431 and UE 401 deactivate active registrations and establish new registrations over at least one of mmW, WIFI, 5GNR, and LP WAN. AMF 431 and UE 401 exchange active N1 signaling for the active registrations between the two active N1 terminators. AMF 431 and UE 401 exchange inactive N1 signaling for the inactive registrations between the two inactive N1 terminators over the active N1 terminators and the active N1 signaling links. The active N1 terminators encapsulate and decapsulate the inactive N1 signaling based on inactive marks in the signaling packets. The inactive N1 terminators maintain their original authentication and authorizations through their inactive periods by periodic messaging and handshakes with AMF 431. AMF 131 does not reauthenticate or reauthorize UE 401 when N1s are reactivated.

In UE 401, the active N1 terminators and the inactive N1 terminators exchange N1 information with 3GPP networking application 506. In AMF 431, the active N1 terminators and the inactive N1 terminators exchange N1 information with 3GPP networking application 1006. 3GPP networking applications 506 and 1006 use the N1 information from both active and inactive N1s to perform ATSSS operations.

The wireless data network circuitry described above comprises computer hardware and software that form special-purpose network circuitry to serve UEs over inactive N1 links using an AMF. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve UEs over inactive N1 links using an AMF.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of serving a wireless user device using N1 signaling, the method comprising:
    establishing active N1 signaling links with the wireless user device and exchanging active N1 signaling with the wireless user device over the active N1 signaling links;
    converting one of the active N1 signaling links for the wireless user device into an inactive N1 signaling link and exchanging inactive N1 signaling with the wireless user device to maintain the inactive N1 signaling link;
    converting the inactive N1 signaling link for the wireless user device back into the one of the active N1 signaling links without performing a new registration for the wireless user device; and
    after converting the inactive N1 signaling link back into the one of the active N1 signaling links, exchanging additional active N1 signaling with the wireless user device over the active N1 signaling links.

2. The method of claim 1 further comprising establishing a new active N1 signaling link with the wireless user device when the one of the active N1 signaling links for the wireless user device comprises the inactive N1 signaling link; and
    exchanging new active N1 signaling with the wireless user device over the new active N1 signaling link.

3. The method of claim 1 further comprising:
    establishing a new active N1 signaling link with the wireless user device when the one of the active N1 signaling links for the wireless user device comprises the inactive N1 signaling link; and
    converting the new active N1 signaling link for the wireless user device into another inactive N1 signaling link before converting the inactive N1 signaling link for the wireless user device back into the one of the active N1 signaling links.

4. The method of claim 1 wherein the one of the active N1 signaling links comprises a Fifth Generation New Radio (5GNR) communication link.

5. The method of claim 1 wherein the one of the active N1 signaling links comprises an Institute of Electrical and Electronic Engineers (IEEE) 802.11 (WIFI) communication link.

6. The method of claim 1 wherein the one of the active N1 signaling links comprises a Millimeter Wave (MMW) communication link.

7. The method of claim 1 wherein the one of the active N1 signaling links comprises a Low-Power Wide Area Network (LP-WAN) communication link.

8. A method of operating an Access and Mobility Management Function (AMF) to serve a wireless user device using N1 signaling, the method comprising:
    the AMF performing registrations for the wireless user device, and in response, establishing active N1 signaling links with the wireless user device;
    the AMF converting one of the active N1 signaling links for the wireless user device into an inactive N1 signaling link and exchanging inactive N1 signaling with the wireless user device to maintain the registration for the inactive N1 signaling link;
    the AMF converting the inactive N1 signaling link for the wireless user device back into the one of the active N1 signaling links based on the registration and the inactive N1 signaling for the wireless user device; and
    the AMF exchanging additional active N1 signaling with the wireless user device over the active N1 signaling links.

9. The method of claim 8 further comprising:
    the AMF performing a new registration for the wireless user device, and in response, establishing a new active N1 signaling link with the wireless user device when the one of the active N1 signaling links for the wireless user device comprises the inactive N1 signaling link; and
    the AMF exchanging new active N1 signaling with the wireless user device over the new active N1 signaling link.

10. The method of claim 8 further comprising:
    the AMF performing a new registration for the wireless user device, and in response, establishing a new active N1 signaling link with the wireless user device when the one of the active N1 signaling links for the wireless user device comprises the inactive N1 signaling link; and
    the AMF converting the new active N1 signaling link for the wireless user device into another inactive N1 signaling link before converting the inactive N1 signaling link for the wireless user device back into the one of the active N1 signaling links.

11. The method of claim 8 wherein the one of the active N1 signaling links comprises a Fifth Generation New Radio (5GNR) communication link.

12. The method of claim 8 wherein the one of the active N1 signaling links comprises an Institute of Electrical and Electronic Engineers (IEEE) 802.11 (WIFI) communication link.

13. The method of claim 8 wherein the one of the active N1 signaling links comprises a Millimeter Wave (MMW) communication link.

14. The method of claim 8 wherein the one of the active N1 signaling links comprises a Low-Power Wide Area Network (LP-WAN) communication link.

15. A wireless network core to serve a wireless user device using N1 signaling, the wireless network core comprising:
- a Network Function Virtualization Infrastructure (NFVI) to execute an Access and Mobility Management Function (AMF) Virtual Network Function (VNF);
- the AMF VNF to perform registrations for the wireless user device, and in response, establish active N1 signaling links with the wireless user device;
- the AMF VNF to convert one of the active N1 signaling links for the wireless user device into an inactive N1 signaling link and exchange inactive N1 signaling with the wireless user device to maintain the registration for the inactive N1 signaling link;
- the AMF VNF to convert the inactive N1 signaling link for the wireless user device back into the one of the active N1 signaling links based on the registration and the inactive N1 signaling for the wireless user device; and
- the AMF VNF to exchange additional active N1 signaling with the wireless user device over the active N1 signaling links.

16. The wireless network core of claim 15 further comprising
- the AMF VNF to perform a new registration for the wireless user device, and in response, establish a new active N1 signaling link with the wireless user device when the one of the active N1 signaling links for the wireless user device comprises the inactive N1 signaling link; and
- the AMF VNF to exchange new active N1 signaling with the wireless user device over the new active N1 signaling link.

17. The wireless network core of claim 15 further comprising:
- the AMF VNF to perform a new registration for the wireless user device, and in response, establish a new active N1 signaling link with the wireless user device when the one of the active N1 signaling links for the wireless user device comprises the inactive N1 signaling link; and
- the AMF VNF to convert the new active N1 signaling link for the wireless user device into another inactive N1 signaling link before converting the inactive N1 signaling link for the wireless user device back into the one of the active N1 signaling links.

18. The wireless network core of claim 15 wherein the one of the active N1 signaling links comprises a Fifth Generation New Radio (5GNR) communication link.

19. The wireless network core of claim 15 wherein the one of the active N1 signaling links comprises an Institute of Electrical and Electronic Engineers (IEEE) 802.11 (WIFI) communication link.

20. The wireless network core of claim 15 wherein the one of the active N1 signaling links comprises a Millimeter Wave (MMW) communication link and a Low-Power Wide Area Network (LP-WAN) communication link.

\* \* \* \* \*